J. U. FIESTER.
LIFTING-JACK.

No. 192,248. Patented June 19, 1877.

UNITED STATES PATENT OFFICE.

JOHN U. FIESTER, OF WINCHESTER, OHIO.

IMPROVEMENT IN LIFTING-JACKS.

Specification forming part of Letters Patent No. 192,248, dated June 19, 1877; application filed April 7, 1877.

*To all whom it may concern:*

Be it known that I, JOHN U. FIESTER, of Winchester, in the county of Guernsey and State of Ohio, have invented a new and valuable Improvement in Lifting-Jacks; and I do hereby declare that the following is a full, clear, and exact description of the construction and operation of the same, reference being had to the annexed drawings, making a part of this specification, and to the letters and figures of reference marked thereon.

Figure 1:
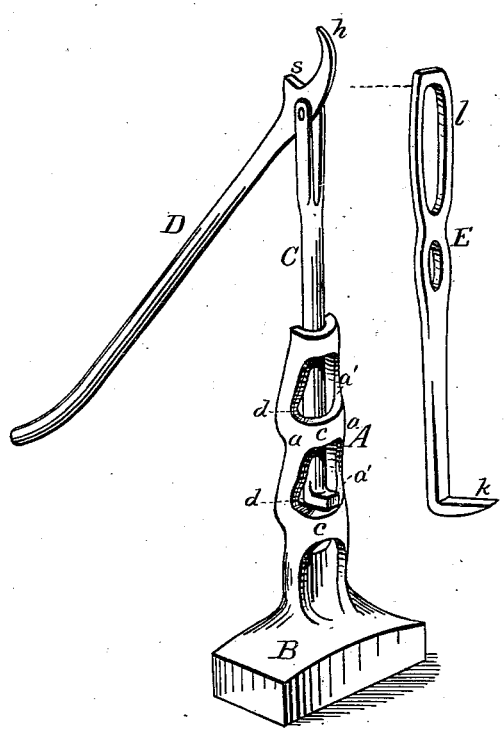
Figure 2:
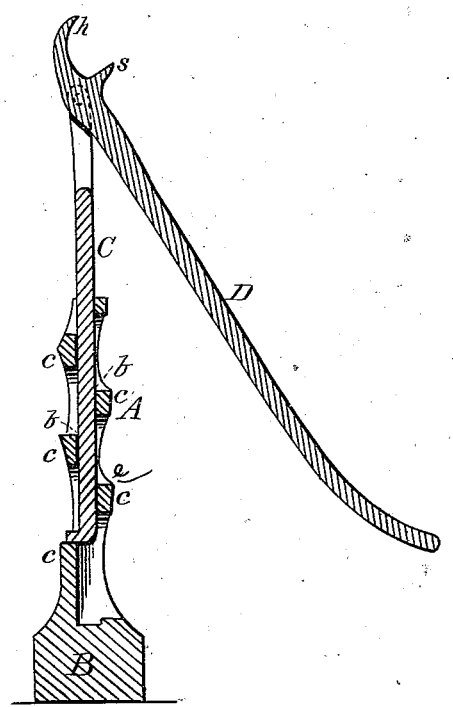

Figure 1 of the drawings is a representation of this invention in perspective. Fig. 2 is a vertical section of the jack.

This invention has relation to carriage-jacks; and it consists in the construction and novel arrangement of the upright or bearing post centrally and axially open for the reception of the adjustable fulcrum-rod, and having a vertical succession of lateral steps alternately arranged on the sides of said post, and communicating with its central opening, to serve as bearings for the toe of said fulcrum-rod, which is adjusted by half-turns, as hereinafter shown and described.

In the accompanying drawings, the letter A designates the bearing-post, which is provided with a base, B, of suitable dimensions. This post may be cast of iron, or otherwise formed of any suitable material. The upright portion is axially hollow, being bounded by the sides $a$ and the alternate inner walls $b$ of the bearing-steps $c$, which extend transversely from one side, $a$, to the other, and project outward on each side of the axial space alternately. In this manner each step $c$ is arranged to form a vertical bearing for the fulcrum-rod C, and a horizontal bearing for the projecting toe $d$ at its lower end.

At the side of each step $c$ a passage, $e$, is formed, leading from the horizontal bearing into the axial space, so that the toe can be turned when the rod is to be raised or lowered. Usually this passage is formed only on the left side of the step, the other side being closed by the wall $a'$ of the post, and forming a bar to further rotation toward the right. The lever being then held to the left, there will be no danger of any accidental alteration of the adjustment under heavy weights.

D represents the lever, having in front a hook, $h$, and stop $s$, of suitable form. This lever is pivoted at the top of the fulcrum-rod C, and its handle is located on the opposite side of said rod from its bearing-toe $d$. The handle is usually curved upward toward its end, to afford a knee-bearing when descending, until the weight is sufficiently raised to hold the lever in position automatically, the center of support passing to the rear of the fulcrum-pin.

E represents an attachment for lifting low objects, such as fences, low wagons, and especially logs. It is provided at one end with a hook, $k$, and at the other with a loop, $l$, the breadth of which is at right angles to the length of the hook.

The loop is designed to be hung upon the hook of the jack-lever, and its hook $k$ placed under the weight.

In lifting logs, the hook may be secured by insertion, and is usually made straight and strong, in order that it may be driven into such objects when necessary.

What I claim as my invention, and desire to secure by Letters Patent, is—

1. The combination, with the axially-open bearing-post A, having the alternate side steps $c$ and passages $e$ at the ends of the same, communicating with the axial opening, of the vertical adjustable fulcrum-rod C, having the bearing-toe $d$, and adapted to be adjusted from one step to another by half-turns, substantially as specified.

2. The link-hook attachment E, having at one end a hook or projection, $k$, and at the other a loop, $l$, the breadth of which is at right angles to said hook or projection, as specified.

In testimony that I claim the above I have hereunto subscribed my name in the presence of two witnesses.

JOHN U. FIESTER.

Witnesses:
J. S. JENKINS,
HATTIE A. JENKINS.